United States Patent
Dougan et al.

(10) Patent No.: US 8,678,780 B2
(45) Date of Patent: Mar. 25, 2014

(54) TRANSMISSION HYDRAULIC CONTROL SYSTEM HAVING A PUMP BYPASS VALVE

(75) Inventors: Kevin Michael Dougan, Plymouth, MI (US); Fredrick R. Poskie, Plymouth, MI (US); Edwin T. Grochowski, Howell, MI (US); Bret M. Olson, Whitelake, MI (US); James W. Haynes, Oxford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1031 days.

(21) Appl. No.: 12/714,140

(22) Filed: Feb. 26, 2010

(65) Prior Publication Data

US 2011/0209470 A1    Sep. 1, 2011

(51) Int. Cl.
*F16H 59/00* (2006.01)
*F16D 25/10* (2006.01)
*F16H 3/38* (2006.01)
*B60W 10/02* (2006.01)
*B60W 10/10* (2012.01)

(52) U.S. Cl.
USPC .......... 417/308; 417/304; 417/307; 192/3.58; 192/48.601; 192/85.63

(58) Field of Classification Search
USPC ......... 417/297, 302–304, 307, 308, 507, 540; 192/3.58, 48.601, 85.63; 60/413; 91/468
See application file for complete search history.

(56) References Cited

U.S. PATENT DOCUMENTS

| | | | |
|---|---|---|---|
| 4,653,352 A * | 3/1987 | Nakao et al. | 477/73 |
| 5,135,091 A * | 8/1992 | Albers et al. | 192/85.63 |
| 8,192,176 B2 * | 6/2012 | Lundberg et al. | 417/307 |
| 8,356,529 B2 * | 1/2013 | Lundberg et al. | 192/3.58 |
| 8,387,476 B2 * | 3/2013 | Buchanan et al. | 74/335 |
| 2004/0178041 A1 * | 9/2004 | Kraxner et al. | 192/87.19 |
| 2011/0056315 A1 * | 3/2011 | Lundberg et al. | 74/473.11 |
| 2011/0092335 A1 * | 4/2011 | Lundberg et al. | 477/79 |
| 2011/0139564 A1 * | 6/2011 | Czoykowski et al. | 192/48.601 |
| 2011/0198178 A1 * | 8/2011 | Lundberg et al. | 192/3.57 |
| 2011/0198179 A1 * | 8/2011 | Lundberg et al. | 192/3.57 |
| 2011/0297499 A1 * | 12/2011 | Lundberg et al. | 192/3.57 |
| 2012/0138406 A1 * | 6/2012 | Lundberg et al. | 192/3.58 |

FOREIGN PATENT DOCUMENTS

| | | |
|---|---|---|
| DE | 19813982 A1 | 10/1999 |
| DE | 19921301 A1 | 11/1999 |
| DE | 19849488 A1 | 5/2000 |
| DE | 10243282 A1 | 4/2004 |
| DE | 102005029963 A1 | 2/2007 |
| EP | 0475488 A1 | 3/1992 |
| EP | 1826438 A2 | 8/2007 |

* cited by examiner

Primary Examiner — Peter J Bertheaud

(57) ABSTRACT

A system for providing pressurized hydraulic fluid in a transmission of a motor vehicle includes a pump for providing pressurized hydraulic fluid having an inlet port and an outlet port. A bypass valve includes an inlet port in communication with the outlet port of the pump, a first outlet port in communication with the inlet port of the pump, and a second outlet port. The inlet port of the bypass valve is in communication with the second outlet port of the bypass valve when the bypass valve is in a first position and the inlet port of the bypass valve is in communication with the first outlet port of the bypass valve when the bypass valve is in a second position. A control device and accumulator are operatively associated with the bypass valve.

16 Claims, 3 Drawing Sheets

TRANSMISSION HYDRAULIC CONTROL SYSTEM HAVING A PUMP BYPASS VALVE

FIELD

The invention to a hydraulic control system for a transmission, and more particularly to an electro-hydraulic control system having an engine driven pump, a pump bypass valve, and an accumulator.

BACKGROUND

The statements in this section merely provide background information related to the present invention and may or may not constitute prior art.

A typical automatic transmission includes a hydraulic control system that, among other functions, is employed to actuate a plurality of torque transmitting devices. These torque transmitting devices may be, for example, friction clutches and brakes. The conventional hydraulic control system typically includes a main pump that provides a pressurized fluid, such as oil, to a plurality of valves and solenoids within a valve body. The main pump is driven by the engine of the motor vehicle. The valves and solenoids are operable to direct the pressurized hydraulic fluid through a hydraulic fluid circuit to the plurality of torque transmitting devices within the transmission. The pressurized hydraulic fluid delivered to the torque transmitting devices is used to engage or disengage the devices in order to obtain different gear ratios.

In certain transmission configurations, actuation of the torque transmitting devices is achieved by selective release of an accumulator charged with hydraulic fluid. The accumulator is charged by the main pump. However, the accumulator typically requires intermittent charging, and therefore it is not necessary to have the main pump constantly operating. Constantly operating the main pump increases the torque load on the engine and reduces fuel efficiency of the motor vehicle. A main pump driven by the engine, however, cannot be selectively disengaged. One solution is to use an electric pump that can be selectively turned off when the accumulator is fully charged. While electric pumps are effective, there is room in the art for alternative solutions that reduce the amount of complex and expensive components while improving efficiency and controllability of the system during operation of the motor vehicle.

SUMMARY

An example of a system for providing pressurized hydraulic fluid in a transmission of a motor vehicle is provided. The system includes a pump for providing pressurized hydraulic fluid having an inlet port and an outlet port. A bypass valve includes an inlet port in communication with the outlet port of the pump, a first outlet port in communication with the inlet port of the pump, and a second outlet port. The bypass valve has a valve moveable between at least a first position and a second position, wherein the inlet port of the bypass valve is in communication with the second outlet port of the bypass valve when the valve is in the first position and wherein the inlet port of the bypass valve is in communication with the first outlet port of the bypass valve when the valve is in the second position. A control device is operatively associated with the bypass valve. The control device is operable to move the valve between the first position and the second position. An accumulator is in communication with the second outlet port of the bypass valve. The accumulator is operable to store the hydraulic fluid. The pump charges the accumulator with the hydraulic fluid when the valve is in the first position and wherein the valve is moved to the second position when the accumulator is fully charged.

In one example of the present invention, the pump is driven by an engine of the motor vehicle.

In another example of the present invention, the inlet port of the pump is in communication with a sump.

In yet another example of the present invention, the control device is an on/off solenoid having an inlet port and an outlet port, and the inlet port is in communication with the second outlet port of the bypass valve and the outlet port is in communication with a control port in the bypass valve.

In yet another example of the present invention, the solenoid includes an open state wherein the inlet port of the solenoid is in communication with the outlet port of the solenoid and a closed state wherein the inlet port of the solenoid is not in communication with the outlet port of the solenoid, and wherein the valve is moved to the second position by hydraulic fluid communicated through the solenoid when the solenoid is in the open state and the valve is moved to the first position by a biasing member when the solenoid is in the closed state.

In yet another example of the present invention, a filter is disposed between the bypass valve and the accumulator.

In yet another example of the present invention, a one-way bypass valve is disposed in parallel relationship with the filter, wherein the one-way bypass valve allows fluid communication from the bypass valve to the accumulator when there is excessive restriction in the filter and prevents fluid communication from the accumulator to the bypass valve.

In yet another example of the present invention, a one way valve is disposed between the bypass valve and the accumulator, wherein the one way valve allows fluid communication between the bypass valve and the accumulator when the valve is in the first position and a pressure of the hydraulic fluid from the pump is greater than a pressure of the hydraulic fluid from the accumulator.

In yet another example of the present invention, a blow off valve is in communication with the second outlet port of the bypass valve, wherein the blow off valve opens when a pressure of the hydraulic fluid from the pump exceeds a maximum pressure required to charge the accumulator.

In yet another example of the present invention, a pressure sensor is in communication with the accumulator, wherein the pressure sensor is operable to sense the pressure of the hydraulic fluid within the accumulator.

Further areas of applicability will become apparent from the description provided herein. It should be understood that the description and specific examples are intended for purposes of illustration only and are not intended to limit the scope of the present invention.

DRAWINGS

The drawings described herein are for illustration purposes only and are not intended to limit the scope of the present invention in any way.

DETAILED DESCRIPTION

The following description is merely exemplary in nature and is not intended to limit the present invention, application, or uses.

Figure 1:
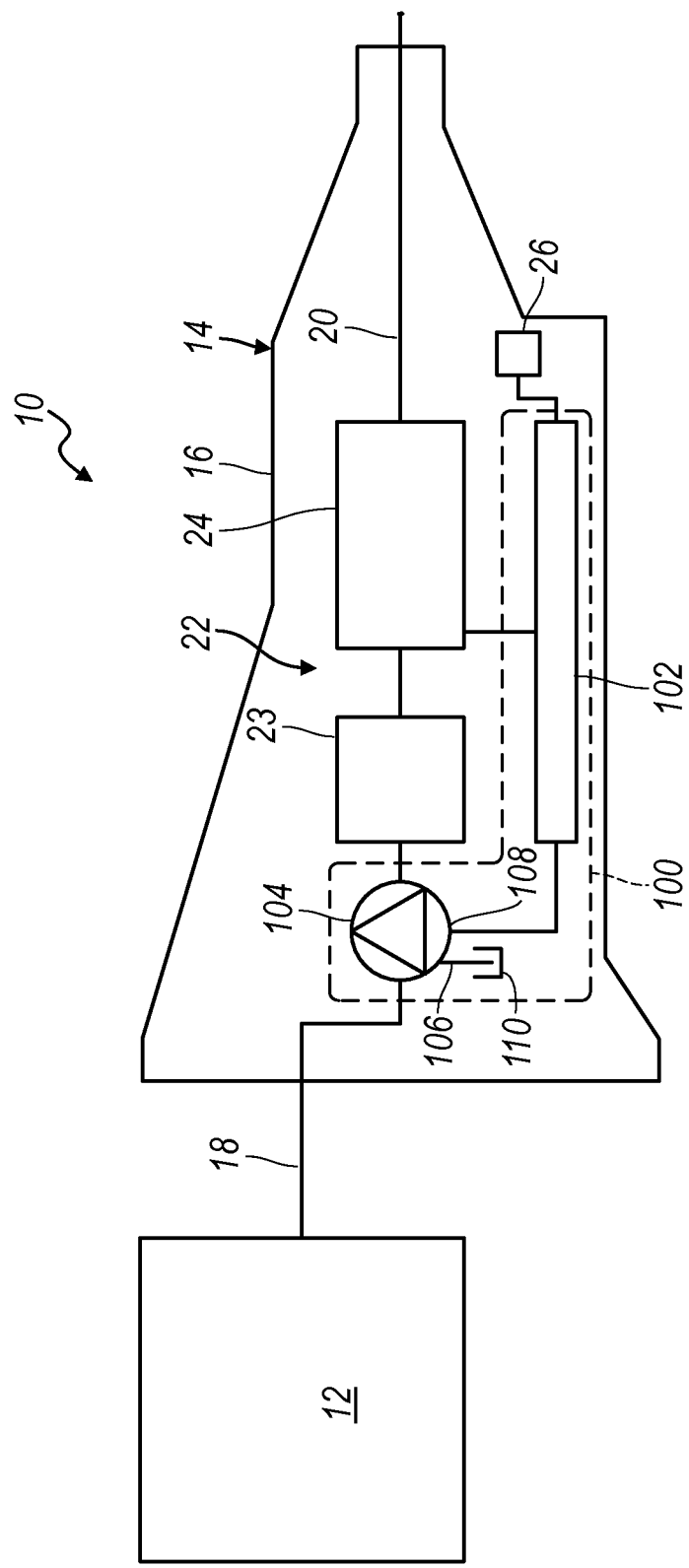
FIG. 1 is a schematic diagram of a powertrain having a hydraulic control system according to the principles of the present invention.

With reference to FIG. 1, an exemplary powertrain is generally indicated by reference number 10. The powertrain includes an engine 12 drivingly coupled to a transmission 14. The engine 12 may be a conventional internal combustion engine or an electric engine, or any other type of prime mover, without departing from the scope of the present invention. In addition, additional components, such as hydrodynamic fluid driving devices such as torque converters, fluid couplings, or electric motors may be disposed between the engine 12 and the transmission 14 without departing from the scope of the present invention. The engine 12 supplies a driving torque to the transmission 14.

The transmission 14 includes a typically cast, metal housing 16 which encloses and protects the various components of the transmission 14. The housing 16 includes a variety of apertures, passageways, shoulders and flanges which position and support these components. The transmission 14 includes a transmission input shaft 18, a transmission output shaft 20, and a gear and clutch arrangement 22. It should be appreciated that while the transmission 14 is illustrated as a rear wheel drive transmission, the transmission 14 may have other configurations without departing from the scope of the present invention. The transmission input shaft 18 is connected with the engine 12 and receives input torque or power from the engine 12. The transmission output shaft 20 is preferably connected with a final drive unit (not shown) which may include, for example, propshafts, differential assemblies, and drive axles. The transmission input shaft 18 is coupled to and provides drive torque to the gear and clutch arrangement 22.

The gear and clutch arrangement 22 includes a dry dual clutch 23 and a plurality of gear change components, schematically indicated by reference number 24. The dry dual clutch 23 is connected between the transmission input shaft 18 and the gear change components 24. The gear change components 24 generally include gear sets, shafts, and torque transmitting devices. The gear sets may include individual intermeshing gears, such as planetary gear sets, that are connected to or selectively connectable to the plurality of shafts. The shafts may include layshafts or countershafts, sleeve and center shafts, reverse or idle shafts, or combinations thereof. The torque transmitting devices are selectively engageable, singly or in combination, to initiate a plurality of forward and reverse gear or speed ratios by selectively coupling individual gears within the plurality of gear sets to the plurality of shafts. The torque transmitting devices may be any type of clutch or brake, including dry dual clutches, wet clutches, band clutches, one-way clutches, etc., and synchronizer assemblies without departing from the scope of the present invention. It should be appreciated that the specific arrangement and number of the gear sets and torque transmitting devices and the specific arrangement and number of the shafts within the transmission 14 may vary without departing from the scope of the present invention.

The transmission 14 also includes a transmission control module 26. The transmission control module 26 is preferably an electronic control device having a preprogrammed digital computer or processor, control logic, memory used to store data, and at least one I/O peripheral. The control logic includes a plurality of logic routines for monitoring, manipulating, and generating data. The transmission control module 26 controls the actuation of the torque transmitting mechanisms via a hydraulic control system 100.

The hydraulic control system 100 is operable to selectively engage the torque transmitting mechanisms within the gear and clutch arrangement 22 by selectively communicating a hydraulic fluid via a valve body 102 to a plurality of shift mechanisms, not shown, that engage the torque transmitting mechanisms. The valve body 102 may have various configurations but generally includes a plurality of valves, solenoids, and fluid passages, none of which are shown in detail. The hydraulic fluid is communicated to the valve body 102 under pressure from a pump 104 that is driven by the engine 12. Accordingly, the pump 104 is operable when the engine 12 is on or running and the pump 104 is inoperable when the engine 12 is off or not running. The pump 104 includes an inlet port 106 and an outlet port 108. The inlet port 106 communicates with a sump 110 and the outlet port communicates with the valve body 102, as will be described in greater detail below. The pump 104 may be of various types, for example, a gear pump, a vane pump, a gerotor pump, or any other positive displacement pump.

Figure 2:
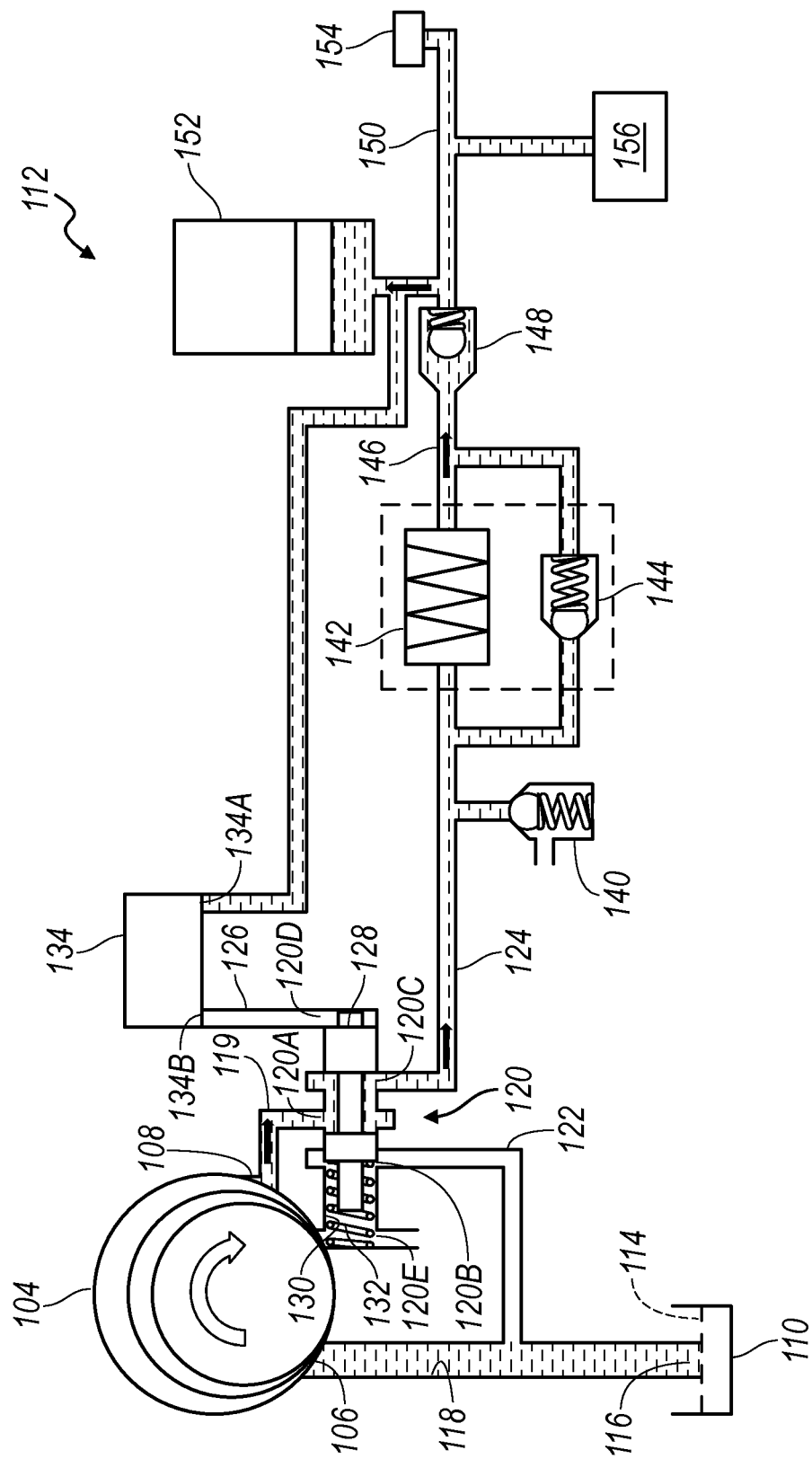
FIG. 2 is a diagram of an example of a portion of a hydraulic control system according to the principles of the present invention in first mode of operation.
Figure 3:
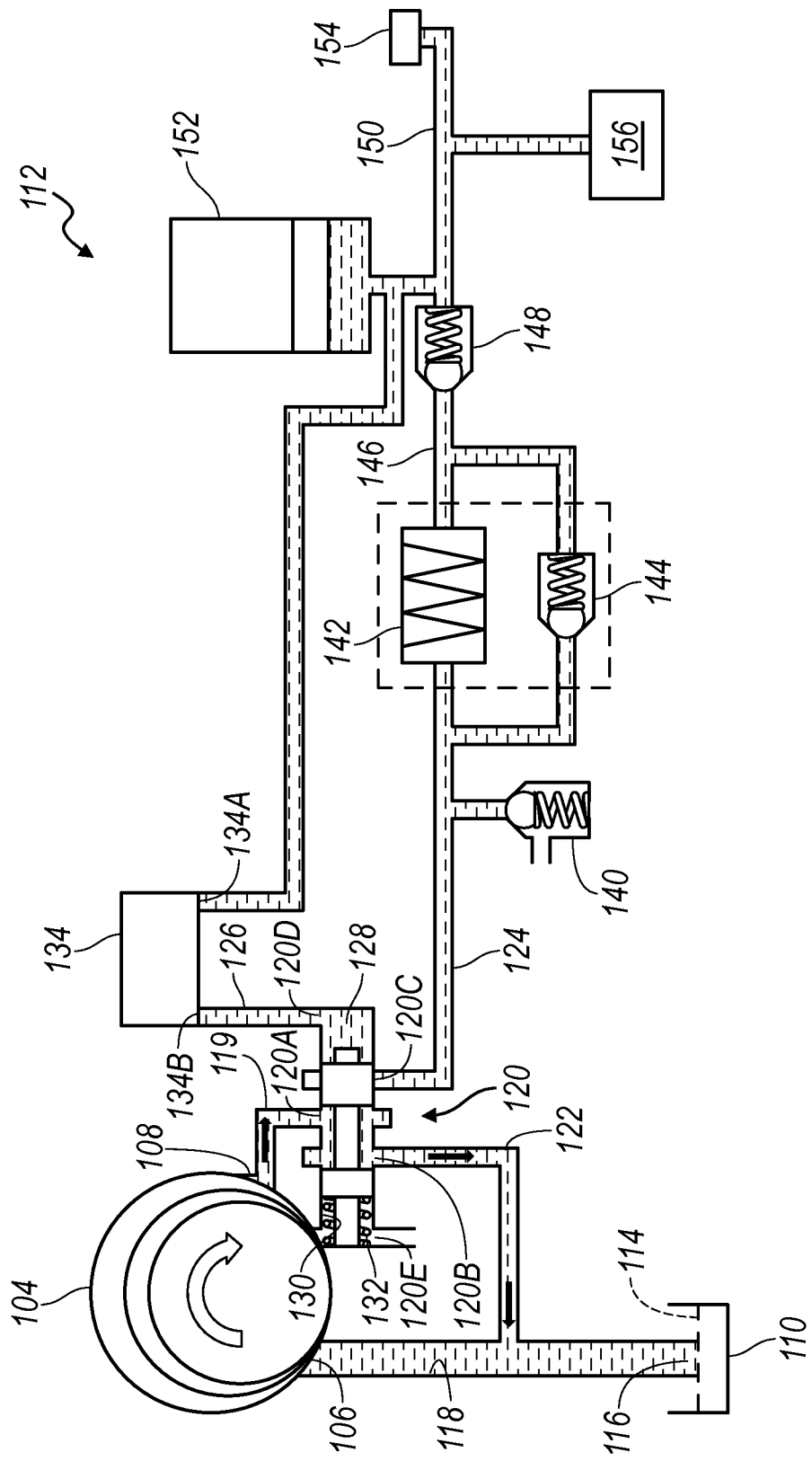
FIG. 3 is a diagram of an example of a portion of a hydraulic control system according to the principles of the present invention in second mode of operation.

Turning to FIGS. 2 and 3, a subsystem within the hydraulic control system 100 is indicated by reference number 112. The subsystem 112 operates as the source of pressurized hydraulic fluid for the transmission 14 and includes the pump 104, as described above, and the sump 110. The sump 110 is a fluid reservoir, typically located at a bottom of the transmission 14, which is operable to store a hydraulic fluid 114. The sump 110 includes an outlet port 116.

The hydraulic fluid 114 is forced from the sump 110 by the pump 104 and is communicated from the outlet port 116 of the sump 110 to the inlet port 106 of the pump via a suction line 118. The outlet port 108 of the pump 104 communicates pressurized hydraulic fluid 114 to a supply line 119. The supply line 119 is in communication with a bypass valve assembly 120.

The bypass valve assembly 120 is operable to divert the flow of hydraulic fluid 114 from the outlet port 108 of the pump 104 to the inlet port 106 of the pump 104. The bypass valve assembly 120 includes an inlet port 120A, a first outlet port 120B, a second outlet port 120C, a control port 120D, and a feedback port 120E. The inlet port 120A is in fluid communication with the supply line 119. The first outlet port 120B is in fluid communication with a return line 122. The return line 122 is in fluid communication with the suction line 118. The second outlet port 120C is in fluid communication with an intermediate line 124. The control port 120D is in fluid communication with a control line 126.

The bypass valve assembly 120 further includes a valve 128 slidably disposed within a bore 130. The valve 128 is moveable between at least two positions by a biasing member 132 and a first control device 134. The biasing member 132 is preferably a spring and acts on an end of the valve 128 to bias the valve 128 to the first position or de-stroked position. The first control device 134 is preferably an on-off solenoid that is normally closed. However, it should be appreciated that other types of solenoids and other control devices may be employed without departing from the scope of the present invention. For example, the first control device 134 may be a direct acting solenoid. The first control device 134 includes an inlet port 134A in fluid communication with the intermediate line 150 and an outlet port 134B in fluid communication with the control line 126. The first control device 134 is electrically actuated by the controller 26 between a closed state and an open state. In the closed state, the inlet port 134A is prevented from communicating with the outlet port 134B. In the open state, the inlet port 134A is allowed to communicate with the outlet port 134B. Accordingly, the first control device 134, when energized to the open state, allows hydraulic fluid 114 to communicate from the inlet port 134A to the outlet port 134B and from the outlet port 134B to the control port 120D via the control line 126. Then, the hydraulic fluid 114 acts on an end of the valve 128 to move the valve 128 to the second position or stroked position against the bias of the basing member 132. When the first control device 134 is de-energized or in the closed state, the flow of hydraulic fluid 114 acting against the valve 128 is cut off and the biasing member 132 moves the valve 128 to the de-stroked position.

When the valve 128 is in the de-stroked position (as shown in FIG. 2), the inlet port 120A is in fluid communication with the second outlet port 120C and the first outlet port 120B is isolated from the inlet port 120A. Accordingly, when the first control device 134 is in the closed state and the valve 128 is in the de-stroked position, pressurized hydraulic fluid 114 from the pump 104 communicates through the bypass valve 120 to the intermediate line 124. When the valve 128 is in the stroked position (as shown in FIG. 3), the inlet port 120A is in communication with the first outlet port 120B and the second outlet port 120C is isolated from the inlet port 120A. Therefore, when the first control device 134 is in the open state and the valve 128 is in the stroked position, pressurized hydraulic fluid 114 from the pump 104 is communicated through the bypass valve 120 back to the suction line 118.

The intermediate line 124 communicates with a spring biased blow-off safety valve 140, a pressure side filter 142, and a spring biased check valve or cold oil bypass valve 144. The spring biased blow-off safety valve 140 communicates with the sump 110. The spring biased blow-off safety valve 140 is set at a relatively high predetermined pressure and if the pressure of the hydraulic fluid 114 in the intermediate line 124 exceeds this pressure, the safety valve 140 opens momentarily to relieve and reduce the pressure of the hydraulic fluid 114. The pressure side filter 142 is disposed in parallel with the spring biased check valve 144. If the pressure side filter 142 becomes blocked or partially blocked due to, for example, slow moving cold hydraulic fluid 114, pressure within the intermediate line 124 increases and opens the spring biased check valve 144 in order to allow the hydraulic fluid 114 to bypass the pressure side filter 142.

The pressure side filter 142 and the spring biased check valve 144 each communicate with an outlet line 146. The outlet line 146 is in communication with a second check valve 148. The second check valve 148 is in communication with a main supply line 150 and is configured to maintain hydraulic pressure within the main supply line 150. The main supply line 150 supplies pressurized hydraulic fluid to an accumulator 152, a main pressure sensor 154, and the various other subsystems within the hydraulic control system 100, indicated schematically by reference number 156. The accumulator 152 is an energy storage device in which the non-compressible hydraulic fluid 114 is held under pressure by an external source. In the example provided, the accumulator 152 is a spring type or gas filled type accumulator having a spring or compressible gas that provides a compressive force on the hydraulic fluid 114 within the accumulator 152. However, it should be appreciated that the accumulator 152 may be of other types without departing from the scope of the present invention. Accordingly, the accumulator 152 is operable to supply pressurized hydraulic fluid 114 back to the main supply line 150. However, upon discharge of the accumulator 152, the second check valve 148 prevents the pressurized hydraulic fluid 114 from returning to the pump 104 and the bypass valve 120. The accumulator 152, when charged, effectively replaces the pump 104 as the source of pressurized hydraulic fluid 114, thereby eliminating the need for the pump 104 to run continuously. The main pressure sensor 154 reads the pressure of the hydraulic fluid 114 within the main supply line 150 in real time and provides this data to the transmission control module 26.

The components of the hydraulic control subsystem 112 are connected via a plurality of fluid communication lines, described above. It should be appreciated that the fluid communication lines may be integrated in a valve body or formed from separate tubing or piping without departing from the scope of the present invention. In addition, the fluid communication lines may have any cross sectional shape and may include additional or fewer bends, turns, and branches than illustrated without departing from the scope of the present invention.

With combined reference to FIGS. 1-3, the operation of the hydraulic control subsystem 112 will now be described. The pump 104 is used primarily for charging the accumulator 152. Lubrication within the transmission 14 is achieved via gearbox splash. Actuation of torque transmitting devices is achieved via discharge of the accumulator 152. Accordingly, the hydraulic control subsystem 112 operates to keep the accumulator charged 152 using the pump 104 while reducing the amount of losses due to the pump 104 operating continuously due to being driven by the engine 12 of the powertrain 10.

For example, the main pressure sensor 154 is used to monitor the pressure of the hydraulic fluid 114 within the accumulator 152. If the accumulator 152 is not fully charged or drops below a threshold value, the controller 26 orders the first control device 134 to the closed state. Therefore, the biasing member 132 within the bypass valve 120 moves the valve 128 to the de-stroked position, shown in FIG. 2. Hydraulic fluid 114 is pumped under pressure from the pump 104 to the inlet port 120A of the bypass valve 120 via the supply line 119, from the inlet port 120A to the second outlet port 120C, from the second outlet port 120C to the pressure side filter 142 via the intermediate line 124, from the pressure side filter 142 to one way valve 148 via the outlet line 146, and from the one-way valve 148 to the accumulator 152 via the main supply line 150. The hydraulic fluid 114 from the pump 104 has sufficient pressure to charge the accumulator 152.

Once the main pressure sensor 154 senses a pressure of the hydraulic fluid 114 within the main supply line 150 that is indicative that the accumulator 152 is fully charged, the controller 26 commands the first control device 134 to the open state. Accordingly, hydraulic fluid 114 within the intermediate line 124 communicates through the first control device 134 to the control port 120D of the bypass valve 120 via the control line 126 The hydraulic fluid 114 acts on the valve 128 and moves the valve 128 to the stroked position, shown in FIG. 3. Hydraulic fluid 114 is pumped under pressure from the pump 104 to the inlet port 120A of the bypass valve 120 via the supply line 119, from the inlet port 120A to the first outlet port 120B, and from the first outlet port 120B to the return line 122 and the suction line 118. Accordingly, the output pressure of the hydraulic fluid 114 from the pump 104 drops to near zero. This in turn reduces the pump torque load on the engine 12, thereby improving the efficiency of the powertrain 10.

The description of the invention is merely exemplary in nature and variations that do not depart from the gist of the invention are intended to be within the scope of the invention. Such variations are not to be regarded as a departure from the spirit and scope of the invention.

We claim the following:

1. A system for providing pressurized hydraulic fluid in a transmission of a motor vehicle, the system comprising:
a pump for providing pressurized hydraulic fluid, the pump having an inlet port and an outlet port;
a bypass valve having an inlet port in communication with the outlet port of the pump, a first outlet port in communication with the inlet port of the pump, and a second outlet port, the bypass valve having a valve moveable between at least a first position and a second position, wherein the inlet port of the bypass valve is in communication with the second outlet port of the bypass valve when the valve is in the first position and wherein the inlet port of the bypass valve is in communication with the first outlet port of the bypass valve when the valve is in the second position;
a control device operatively associated with the bypass valve, the control device operable to move the valve between the first position and the second position; and
an accumulator in communication with the second outlet port of the bypass valve, the accumulator operable to store the hydraulic fluid,
wherein the pump charges the accumulator with the hydraulic fluid when the valve is in the first position and wherein the valve is moved to the second position when the accumulator is fully charged,
wherein the control device is an on/off solenoid having an inlet port and an outlet port, and wherein the inlet port is in communication with the second outlet port of the bypass valve and the outlet port is in communication with a control port in the bypass valve and wherein the fluid flows into the solenoid through the inlet port and flows out from the solenoid through the outlet port.

2. The system of claim 1 wherein the pump is driven by an engine of the motor vehicle.

3. The system of claim 1 wherein the inlet port of the pump is in communication with a sump.

4. The system of claim 1 wherein the solenoid includes an open state wherein the inlet port of the solenoid is in communication with the outlet port of the solenoid and a closed state wherein the inlet port of the solenoid is not in communication with the outlet port of the solenoid, and wherein the valve is moved to the second position by hydraulic fluid communicated through the solenoid when the solenoid is in the open state and the valve is moved to the first position by a biasing member when the solenoid is in the closed state.

5. The system of claim 1 further comprising a filter disposed between the bypass valve and the accumulator.

6. The system of claim 5 further comprising a one-way bypass valve disposed in parallel relationship with the filter, wherein the one-way bypass valve allows fluid communication from the bypass valve to the accumulator and prevents fluid communication from the accumulator to the bypass valve.

7. The system of claim 1 further comprising a one way valve disposed between the bypass valve and the accumulator, wherein the one way valve allows fluid communication between the bypass valve and the accumulator when the valve is in the first position and a pressure of the hydraulic fluid from the pump is greater than a pressure of the hydraulic fluid from the accumulator.

8. The system of claim 1 further comprising a blow off valve in communication with the second outlet port of the bypass valve, wherein the blow off valve opens when a pressure of the hydraulic fluid from the pump exceeds a maximum pressure required to charge the accumulator.

9. The system of claim 1 further comprising a pressure sensor in communication with the accumulator, wherein the pressure sensor is operable to sense the pressure of the hydraulic fluid within the accumulator.

10. A system for providing pressurized hydraulic fluid in a transmission of a motor vehicle, the motor vehicle having an engine, the system comprising:
a sump for storing a hydraulic fluid;
a pump driven by the engine, the pump having an inlet port in communication with the sump and an outlet port, wherein the pump is operational to draw hydraulic fluid from the inlet port of the pump and provide pressurized hydraulic fluid to the outlet port of the pump;
a bypass valve having an inlet port in communication with the outlet port of the pump, a first outlet port in communication with the inlet port of the pump, and a second outlet port, the bypass valve having a valve moveable between at least a first position and a second position, wherein the inlet port of the bypass valve is in communication with the second outlet port of the bypass valve when the valve is in the first position and wherein the inlet port of the bypass valve is in communication with the first outlet port of the bypass valve when the valve is in the second position;
a control device operatively associated with the bypass valve, the control device operable to move the valve between the first position and the second position; and
an accumulator in communication with the second outlet port of the bypass valve, the accumulator operable to store the hydraulic fluid,
wherein the pump charges the accumulator with the hydraulic fluid when the valve is in the first position and wherein the valve is moved to the second position when the accumulator is fully charged,
wherein the control device is an on/off solenoid having an inlet port and an outlet port, and wherein the inlet port is in communication with the second outlet port of the bypass valve and the outlet port is in communication with a control port in the bypass valve and wherein the fluid flows into the solenoid through the inlet port and flows out from the solenoid through the outlet port.

11. The system of claim 10 wherein the solenoid includes an open state wherein the inlet port of the solenoid is in communication with the outlet port of the solenoid and a closed state wherein the inlet port of the solenoid is not in communication with the outlet port of the solenoid, and wherein the valve is moved to the second position by hydraulic fluid communicated through the solenoid when the solenoid is in the open state and the valve is moved to the first position by a biasing member when the solenoid is in the closed state.

12. The system of claim 10 further comprising a filter disposed between the bypass valve and the accumulator.

13. The system of claim 12 further comprising a one-way bypass valve disposed in parallel relationship with the filter, wherein the one-way bypass valve allows fluid communication from the bypass valve to the accumulator and prevents fluid communication from the accumulator to the bypass valve.

14. The system of claim 10 further comprising a one way valve disposed between the bypass valve and the accumulator, wherein the one way valve allows fluid communication between the bypass valve and the accumulator when the valve is in the first position and a pressure of the hydraulic fluid from the pump is greater than a pressure of the hydraulic fluid from the accumulator.

15. The system of claim 10 further comprising a blow off valve in communication with the second outlet port of the bypass valve, wherein the blow off valve opens when a pressure of the hydraulic fluid from the pump exceeds a maximum pressure required to charge the accumulator.

16. The system of claim 10 further comprising a pressure sensor in communication with the accumulator, wherein the pressure sensor is operable to sense the pressure of the hydraulic fluid within the accumulator.

* * * * *